May 28, 1968 W. L. OVERALL ET AL 3,385,432
COMBINED STRATIFICATION AND AQUEOUS SUSPENSION SEPARATOR
Filed March 2, 1965 3 Sheets-Sheet 1

INVENTORS
WAYNE L. OVERALL &
BY JOHN H. WEBER

Marchal, Biebel, French & Bugg
ATTORNEYS

May 28, 1968 W. L. OVERALL ET AL 3,385,432
COMBINED STRATIFICATION AND AQUEOUS SUSPENSION SEPARATOR
Filed March 2, 1965 3 Sheets-Sheet 2
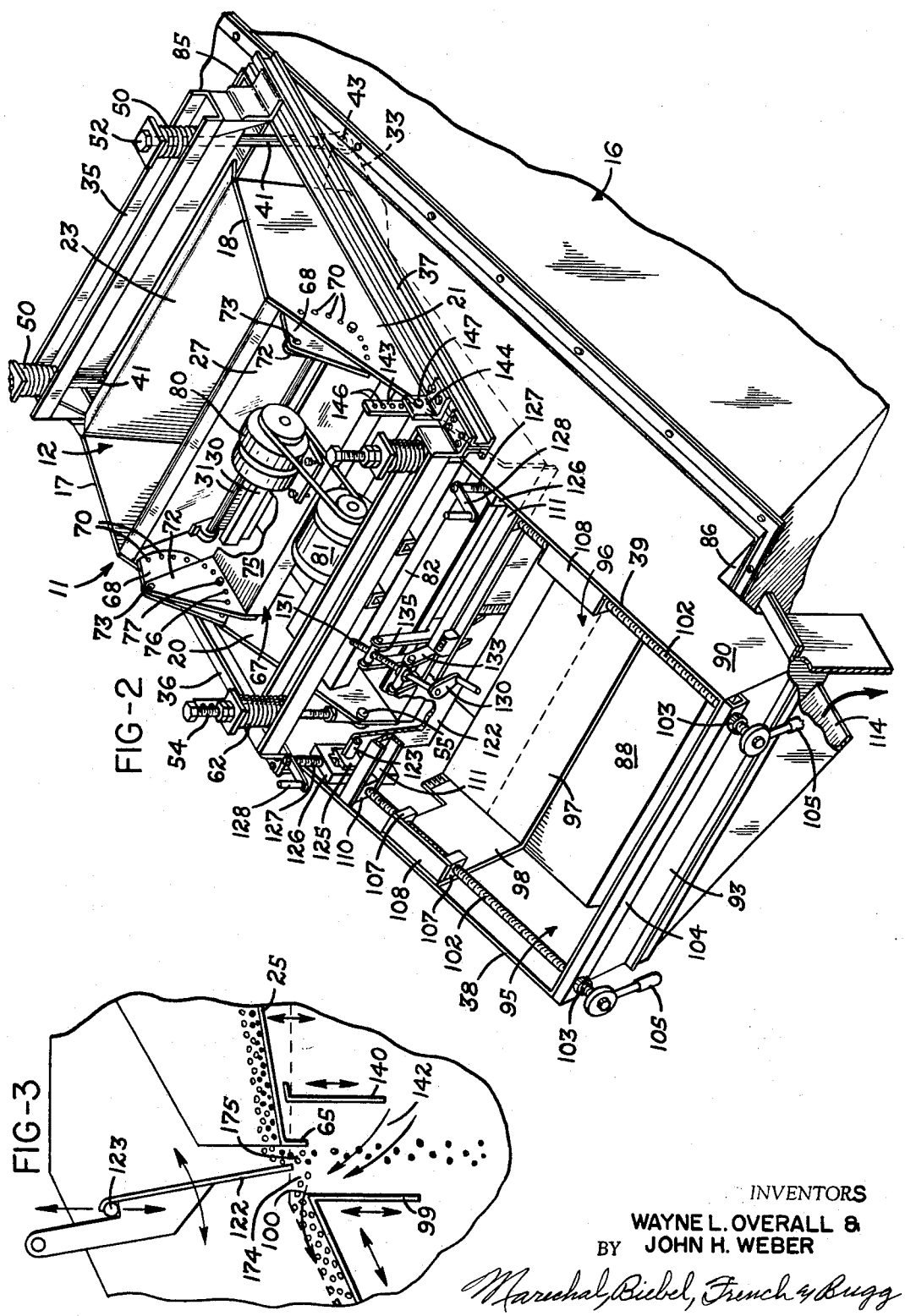
INVENTORS
WAYNE L. OVERALL &
BY JOHN H. WEBER
*Marshal, Biebel, French & Bugg*
ATTORNEYS

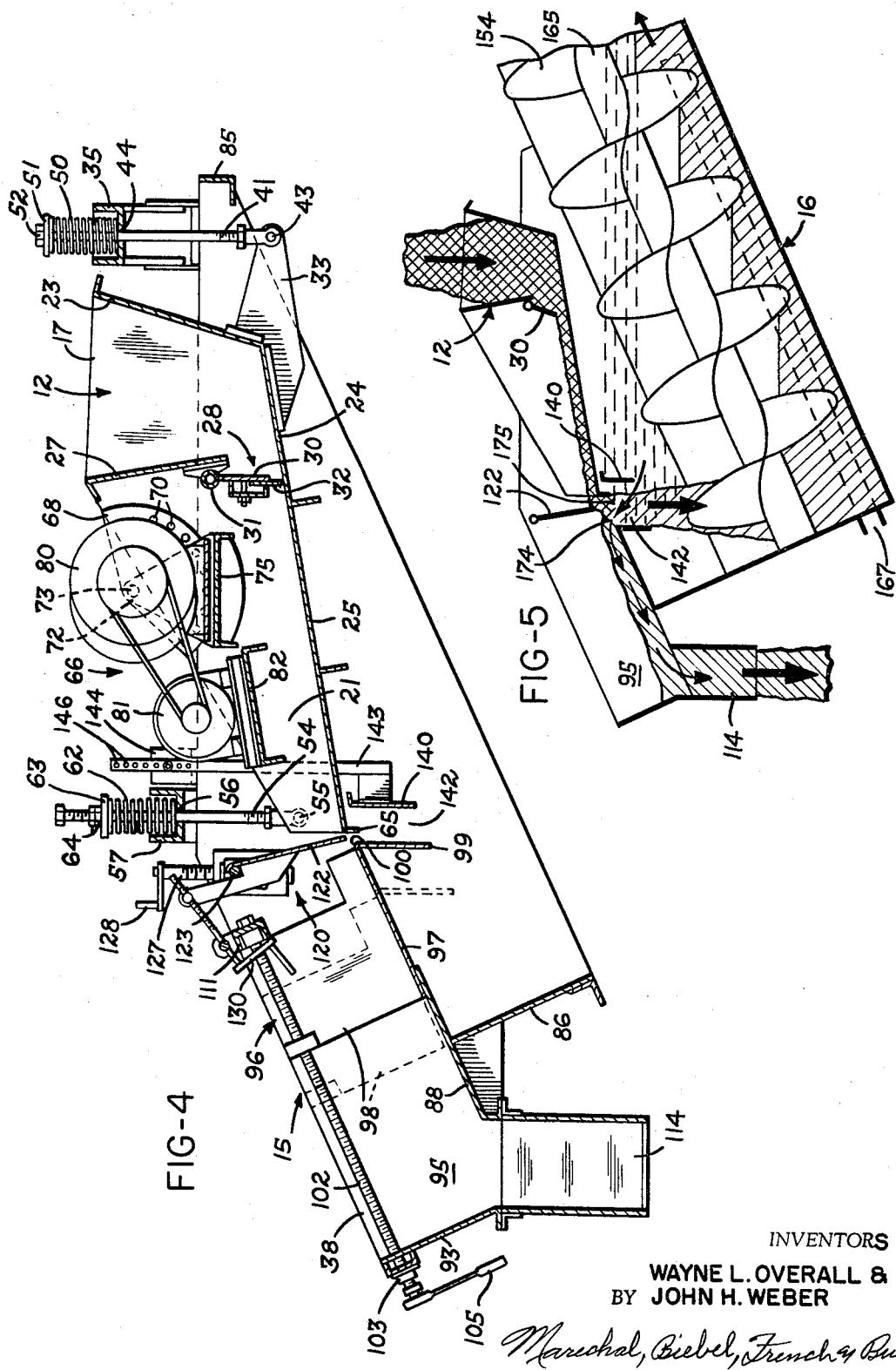

United States Patent Office 3,385,432
Patented May 28, 1968

3,385,432
COMBINED STRATIFICATION AND AQUEOUS
SUSPENSION SEPARATOR
Wayne L. Overall and John H. Weber, Dayton, Ohio, assignors to Cindaco, Inc., Dayton, Ohio, a corporation of Ohio
Filed Mar. 2, 1965, Ser. No. 436,510
9 Claims. (Cl. 209—18)

ABSTRACT OF THE DISCLOSURE

Apparatus and process for separating granular materials to remove lightweight undesirable material from heavy material. The material is vibrated on a distributor to cause stratification with the lighter particles on top of the heavier particles, after which they are allowed to fall into a quiet pool of water having an upward flow on one side and beneath the quiet zone. The heavier particles pass through the upward flow whereas the lighter particles are picked up by the upward flow and carried over a weir to a point remote from the system. The quiet zone and upward flow are separated by a splitter gate mounted parallel to the lower edge of the distributor and the weir. Each of the components of the apparatus are adjustable to accommodate different materials.

---

This invention relates to the separation of granular materials, and particularly to an apparatus and process for removing deleterious or undesired material from desirable materials and the like.

An important object of the invention is to provide a high speed process and apparatus for removing lower specific gravity material from a higher specific gravity material, and particularly to provide such an apparatus and process for removing coal, lignite, shale, chert, chalk, clay, and wood particles, and lightweight impurities from sand, gravel, stone, and other granular materials.

Another object of this invention is to provide an apparatus for separating particles by their specific gravity differentials which can be adjusted to accommodate the materials being processed and thereby enable variation in the particle size at which separation occurs.

A further object of this invention is to provide an apparatus for separating undesirable impurities from sand, gravel and stone by effecting stratification of the material and then feeding the material evenly and at high speed into a relatively quiet pool of liquid through which it settles into a vertical flow of water which picks up the particles of lower specific gravity and carries them over an adjustable weir to be used as a waste or secondary product.

A still further object of this invention is to provide a universally adjustable separator assembly which can be adapted for use with a wide range of granular materials, and particularly to provide such apparatus which is simple in design and operation for maximum dependability and minimum maintenance.

Other objects and advantages of the invention will be apparent from the following description, the accompanying drawings and the appended claims.

In the drawings—

FIG. 2 is a perspective view showing the top portion of the feeder-distributor and separator of the separator assembly;

FIG. 3 is a schematic diagram illustrating the operation of the invention;

FIG. 4 is a vertical sectional view taken centrally through the feeder-distributor and separator; and FIG. 5 is another schematic view illustrating the operation of the invention.

Figure 1:
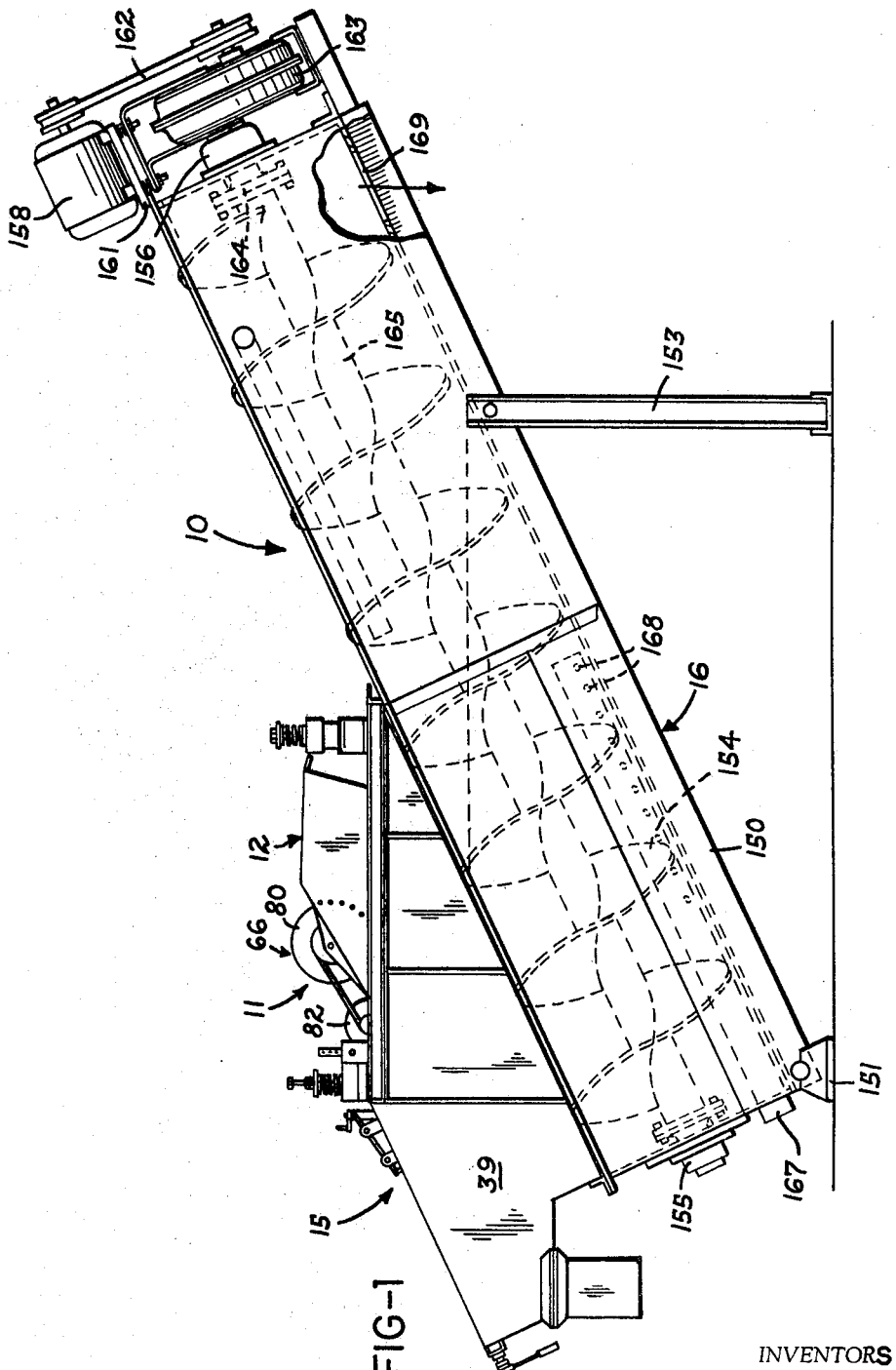
FIG. 1 is a side elevation view of the separator assembly in accordance with the invention.

Referring to the drawings wherein a preferred embodiment of the invention is shown, FIG. 1 illustrates the assembly 10 which includes a feeder-distributor 11 having a hopper 12 for receiving flowable material (e.g., wet or dry gravel) to be separated in accordance with its specific gravity. The feeder-distributor 11 is resiliently mounted in the separator 15, and this separator is then mounted on a screw dehydrator 16 which removes the water from the finished product, as will be seen.

As shown in FIGS. 2 and 4, the hopper 12 has the side walls 17 and 18 which are formed by extensions on the side walls 20 and 21 on the distributor 11. The hopper 12 is further defined by a back wall 23 extending between the side walls 17 and 18, and a bottom wall 24 which extends continuously beyond the hopper 12 and forms the flat bottom wall 25 of the distributor 11. The forward end wall 27 extends between the side walls 17 and 18 and stops short of the bottom wall 24 and thus defines a rectangular discharge opening 28 which is closed by the free swinging regulator door 30 pivotally mounted on the hinge 31 secured to the wall 27. The lower edge 32 of the door 30 is made of rubber and is adjustable with respect to the bottom wall 25 to regulate the flow of material from the hopper 12, and this lower edge 32 also acts to smooth out and limit the flow of material from the hopper 12.

The rear portion of the distributor 11 is supported on the separator 15 by a pair of identical brackets 33 secured to the back and bottom walls 23 and 24 and extending horizontally therefrom, as shown in FIG. 4. A U-shaped cross channel 35 (FIG. 2) is rigidly secured at its opposite ends to the channel members 36 and 37 on the top edges of the separator side walls 38 and 39, and this cross channel extends across the separator 15 above the ends of the brackets 33. The tie rods 41 are then used to secure the brackets 33 to the cross channel 35, and particularly, the pivot pins 43 secure the rods 41 to the brackets 33 and these rods extend upwardly through suitable openings 44 in the channel 35. The coil springs 50 are interposed between the upper surface of the channel 35 and the washer 51 and nut 52 on the upper ends of the rods 41 to provide resilient mounting of the rear portion of the distributor 11.

The front portion of the distributor 11 is mounted in a manner similar to the rear portion thereof, and thus the rods 54 (FIGS. 2 and 4) are connected to the forward end of the feeder-distributor side walls 20 and 21 by the pins 55 and extend upwardly through suitable openings 56 in the cross channel 57 which extends from between rigid connections with channels 36 and 37. The coil springs 62 are interposed between the upper surface of the cross channel 57 and the bearing plate on the washer 63 for resilient mounting of the front end of the distributor 11. The vertical position of the washer 63 can be adjusted on the rod 54 by use of the nuts 64 so that the front end of the distributor can be lowered and raised in a vertical plane. Since there are no rigid connections between the distributor 11 and the separator 15, the distributor 11 is free to move within limits with respect to the separator 15. The bottom wall 25 of the distributor 11 has a flat rectangular surface which is sloped to enable the material to flow from the hopper 12 and drop off the lip 65 on the lowermost portion of the wall 25.

A vibrator assembly 66 is mounted on the distributor 11 for vibrating or shaking the distributor at a frequency to facilitate the flow, distribution and stratification of the material as it passes from the hopper 17 into the feed orifice. This assembly includes a cradle 67 extending between the adjustment plates 68 rigidly secured to the side walls 20 and 21 of the distributor. The adjustment plates 68 are shaped as a segment to the circle and have a series of apertures 70 around the peripheral portion thereof through the adjacent side wall 20 or 21, shown in FIG. 2.

The cradle 67 consists of the side members 72 which are pivotally secured to the adjustment plates 68 by the pins 73, and the flat cross member 75 which extends between the two side members 72. The side members 72 have a plurality of apertures 76 thereon on the same radius as those of the adjustment plates 68 so that the cradle 67 can be adjusted between an angle of approximately 100° between a horizontal and a vertical position by appropriately positioning the cradle 67 and using the removable pins 77 to lock it in position on the plates 68.

The vibrator assembly 67 further includes an eccentric shaker or vibrator 80 mounted centrally on the cradle which when driven at high speed causes the cradle 67 and the associated feeder-distributor 11 to shake at a preset frequency. A suitable shaker for this purpose is manufactured by Ajax Flexible Coupling Co., Inc., to Westfield, N.Y., U.S.A., sold as Model No. 12C–HH, although it should be understood that other types of vibrators can be used without departing from the scope of the invention. The vibrator 80 is driven by an electric motor 81 which is supported on the cross member 82 secured between the side walls 20 and 21 of the distributor so that the vibrator assembly 67 is mounted entirely on the feeder-distributor 11. By adjusting the position of the cradle 67 the pitch of the vibrations can be varied between horizontal and vertical.

Referring now to the structure of the separator 15, the vertical side walls 38 and 39 of the separator are generally triangular in configuration and the channel member 85 (FIG. 4) interconnects the rear portion thereof. Another end wall 86 extends between the opposite end of side walls 38 and 39 below the discharge plate 88. The forward portions 90 of the side walls extend beyond the end wall 86 to form side walls on the flat discharge plate 88 disposed at right angles thereto, whereas another end wall 93 extends between the forward portions 90 to form a discharge chamber 95.

Between the side walls 38 and 39 and the adjacent discharge plate 88 is an adjustable weir assembly 96 which includes a flat bottom plate 97 having the upright side members 98 thereon which reciprocates on the discharge plate 88 between the side walls 38 and 39. This adjustable weir assembly is fitted sufficiently tight to the adjacent side walls so that there is no substantial water leakage therebetween as will be seen. The right-hand edge of the bottom plate 97 has a downwardly extending flange 99 with the weir 100 formed at the juncture between this flange and the bottom plate 97. The purpose of this flange is to define one side of an upward flow path, and this flange may be tapered, sloped, rounded, or vertical without departing from the invention.

The weir assembly 96 is moved parallel to the bottom plate 88 by the threaded rods 102 adjacent each of the side walls 38 and 39. These rods 102 pass through a bearing member 103 secured to the channel 104 across the top of an end wall 93 for prohibiting axial movement of the rods while allowing the same to be rotated. The hand cranks 105 are secured to the end of these rods to permit rotation thereof by hand.

The side members 98 on the weir assembly 96 have threaded blocks 107 secured adjacent the top edge thereof and the intermediate brace 108 aids in securing them rigidly in position. The blocks 107 are internally threaded so that, as the rods 102 are rotated, the weir assembly 96 is caused to move in a direction parallel to the rods. The opposite ends of the rods are supported in bearing members 110 which are mounted on the cross channel 111, as seen in FIG. 2, to provide rigidity to the rods 102 and enable smooth reciprocation of the weir assembly 96. A sloping discharge chute 114 is provided at the left-hand end of the discharge chamber 95 as seen in FIGS. 2 and 4, so that the material flowing along this plate is collected in the chute 114 for flow to a point remote from the separator assembly 10.

A splitter gate assembly 120 is provided between the vertical flange 99 and the lip 65 on the forward end of the distributor bottom wall 25, and this assembly includes a mechanism for permitting angular and vertical adjustment thereof. Accordingly, as shown in FIGS. 2 and 4, the flat rectangular gate 122 is rigidly secured to the cross rod 123 supported at its opposite end in the blocks 125 which reciprocate within the frame members 126 by manually rotating the screws 127. Thus when the cranks 128 rotate the screws 127, the blocks 125 move therewith to adjust the splitter gate 122 in a vertical direction.

The gate 122 is moved in an angular direction about the axis of the rod 123 by another hand crank 130 (FIGS. 2 and 4) which has a threaded rod 131 secured thereto and extending through a bracket 133 on the cross member 111 into a threaded aperture in the rod 135 mounted between the upwardly extending arms 136 which are secured ot the gate, as shown in FIGS. 2 and 4. By rotating the crank 130, the splitter gate 122 rotates about the axis of the support rod 123, and thus by adjusting the manual cranks 128 and 130 the gate 122 can be positioned at substantially any attitude and distance between the weir 100 and the discharge lip 65 of the bottom wall 25 on the distributor 11.

An adjustable stilling plate 140 is mounted beneath the distributor 11 to define a vertical flow path 142 between this plate and the vertical flange 99 on the adjustable weir assembly 96. The plate 140 is mounted in a vertical position by the arms 143 which extend vertically upwardly from the connector brackets 144 on each end of the plate 140. The upper ends of the arms 143 have a plurality of apertures 146 therein so that the pins 147 can be inserted therethrough to lock the arms to the brackets 144 on the channels 36 and 37. The flange 99 on the adjustable weir assembly 96, the splitter gate 122, the lip 65 on the distributor 11, and the stilling plate 140 extend substantially coextensively between the side walls 38 and 39 of the separator 15 so that they cooperate to achieve separation in a substantially improved manner.

The separator 15 is mounted rigidly in a fluid tight manner on the screw-dehydrator 16 which includes an elongated housing 150 having a substantially square cross section and mounted at an angle by the feet 151 at the lower end thereof and the legs 153 at an intermediate point. The housing 150 is completely enclosed except for the top thereof which has the lower end partially closed by the separator 15. Mounted within the dehydrator housing 150 is a dehydrator screw 154 which is supported at its opposite ends by the bearing members 155 and 156. The right-hand end of the screw is driven by the electric motor 158 mounted on the housing bracket 161 and driving the screw 154 through the belt 162, the gear reduction unit 163, and the connection 164 with the central shaft 165 of the screw.

The dehydrator is supplied with a continuous flow of water through the inlet pipe 167 and this pipe is disposed on the dead side of the screw 154 so that when the water flows under pressure through the various holes 168 along the length of the pipe, the material which has collected at this dead area will be recirculated. The screw 154 conveys the particles which settle to the bottom of the housing 150 by moving them from the lower end of the housing to the outlet 169 above the water line.

The various adjustments are dictated by the type of material and the results desired, and by setting the rate of vibration, the direction of vibration, the water flow rate, the positions of the splitter gate 122, the weir 100, and the stilling plate 140, the separator assembly can be properly adjusted to accomplish the desired separation. These adjustments are indicated schematically in FIG. 3. While the adjustments have been shown and described as being made manually, it is within the scope of this invention to provide automatic controls to make these adjustments by merely turning a dial or pushing a button, and it is possible to program completely these controls so that they are controlled by a computer.

Referring to FIG. 3 and 5, the separator is ready for operation when the various adjustments are made and the dehydrator 16 is supplied with sufficient flow of water to permit the desired flow of water over the weir 100, usually from ½ inch to 6 inches depending on the specific gravity differential of the material being processed. Even with minimum overflow the water level is very close to the lip 65 of the distributor 11 so that little or no splashing or turbulence occurs as the particles pass into the water. The overflowing water creates an upward flow in the path 142 and the gate 122 divides the upper portion of this path into an overflow orifice 174 between the vertical flange 99 and the gate 122 and a quiet pool or feed orifice 175 between the stilling plate 140.

The aggregate or other granular material is then placed in the hopper 12 and the vibrator 80 energized to cause uniform flow of material along the bottom wall 25 at a rate regulated by the pivotal door 30, the rate of vibration and the location of the vibrator cradle. As the material flows along this wall 25 the vibration causes stratification, with the lighter particles moving to the top surface above the heavier particles. The material then slides gently off the wall 25 into the feed orifice 175 between the gate 122 and the lip 65 with the lighter particles closest to the gate 122. As the particles pass downwardly through this quiet pool, the lighter particles come into contact with the vertical stream of water in the overflow orifice passing upwardly between the weir 100 and the gate 122, which picks up the lighter particles and carries them over the weir 100 to the discharge chute 114. The heavier particles pass downwardly through the quiet pool 175 into the upward flow path 142, and since their specific gravity is greater and since they avoid some of the high volume water flow between the weir 100 and the gate 122, they pass downwardly into the bottom of the dehydrator 16.

Without the stratification the combination of the feeder-distributor 11, splitter gate 122, and the stilling plate 140 which together form the quiet feed orifice, many of the particles of higher specific gravity would be carried by the flow over the weir so that the efficiency of the unit would be greatly impaired. The lighter particles having a lesser specific gravity are carried through the discharge chute 114 and appropriately disposed of in a secondary product. The primary particles which are collected on the bottom of the dehydrator 16 are conveyed upwardly above the water level by the rotating screw 154 and discharged free of a large portion of the water through the opening 167. It has also been found that denser particles which hit the gate 122 rebound therefrom a distance greater than lighter particles, and here again effective separation occurs since the lighter particles tend to drop straight down into the upward flow and into the feed orifice 175.

The depth of penetration of the splitter gate 122 below the water level is a critical adjustment and depends upon the size and density of the particles being processed, and normally the depth of penetration varies between ¼ and 1 inch. Similarly, the spacing between the gate 122 and the lip 65, and between the gate 122 and the weir 100 vary the width of the feed 175 and overflow orifices 174, and these dimensions also are critical and depend upon the particular material being handled. By adjusting the depth of overflow over the weir 100, by retracting the weir assembly 96, it is possible to effectively separate gravel which consists of large stones, e.g., up to 2½ inch diameter. By increasing the pitch of the vibrator 80 toward the horizontal, speed is increased whereas an increase in the vertical pitch increases stratification on the wall 25.

The invention has thus provided a process and apparatus for separating granular materials according to their specific weights by first effecting stratification of the material and then passing the materials through a quiet pool of water in such a manner that the lighter particles are picked up more readily by an upwardly flowing path of water. The apparatus is particularly suited for handling sand and gravel, although other granular materials may be handled and it is adjustable so that it will accommodate materials of different size and specific weights.

While the invention is shown as having a single hopper 12, it is within the scope of the invention to use more than one hopper, and furthermore it is possible to use more than one of the distributors 11 to cooperate with a single separator and dehydrating screw. The invention is not limited to the use of a screw dehydrator and it is possible to use other means for removing the primary product from the water. It is further possible to create the feed orifices in the upward flow of water in the path 142 by means other than an overflow weir 100 without departing from the scope of the invention.

While the process and apparatus herein described constitute preferred embodiments of the invention, it is to be understood that the invention is not limited to this precise process and apparatus, and that changes may be made therein without departing from the scope of the invention which is defined in the appended claims.

What is claimed is:

1. Apparatus for separating particles according to specific gravities, comprising a hopper adapted to receive said material, a flat sloping surface associated with said hopper adapted to receive a thin layer of particles from said hopper, means defining an opening for creating an even distribution of the material onto said surface, means for vibrating said surface to cause said material to move along said surface and the lighter material to be segregated above the heavier material, an edge at the lower end of said surface, an overflow weir parallel to said edge and spaced therefrom a predetermined short distance, said weir being spaced vertically below said edge, container means for maintaining a level of water sufficient to cause water to flow continually over said weir, means to conduct the water flowing over said weir to a point remote from said container means, and a splitter gate having a lower portion parallel to and spaced between said edge and said weir and extending below the level of the water a short distance to create a quiet zone adjacent said edge and an upward flow zone between said gate and said weir and below said quiet zone to permit the higher specific gravity particles to pass through said quiet zone into the container means and the lower specific gravity particles to be picked up by the upward flow of water in said upward flow zone to be carried over said weir to a point remote from said container means.

2. Apparatus for separating particles according to specific gravities, comprising a housing, a distributor resiliently mounted on said housing for feeding the particles along a surface and over an edge at the lower end thereof, means for vibrating said distributor to facilitate the uniform and even flow along said surface and to cause the lighter material to be segregated above the heavier material, an overflow weir on said housing parallel to said edge and spaced therefrom a predetermined short distance, said housing defining container means adapted to have a preset level of water therein sufficient to create a flow of water continually over said weir, means to conduct the water flowing over said weir to a point remote from said container means, a stilling plate disposed below said water level parallel to said edge, a splitter gate having a lower portion parallel to and spaced between said stilling plate and said weir and extending below the top surface of the water about one inch to create a quiet zone between said splitter gate and said stilling plate and an upward flow zone between said gate and said weir, and means for supplying a volume of water to said container means correlated with the particles being separated to permit said upward flow zone to pick up the lower specific gravity particles and carry them over said weir to a point remote from said container means and to permit the higher specific gravity particles to pass through said quiet zone into the container means.

3. Apparatus as defined in claim 2 wherein said weir, said stilling plate and said splitter gate are substantially coextensive in length between opposed side walls of said housing.

4. Apparatus as defined in claim 2 wherein said weir is adjustably mounted in said housing for movement toward and away from said splitter gate to increase the width of said upward flow zone.

5. Apparatus as defined in claim 2 wherein said splitter gate is adjustably mounted in said housing for movement between said edge and said weir to vary the width of said quiet and upward flow zones to vary the specific gravity at which separation occurs.

6. Apparatus as defined in claim 2 wherein said means for vibrating said distributor is adjustable between a first position wherein the vibration is primarily in a horizontal direction to increase the rate of feed of the particles and a second position wherein said means for vibrating said distributor produces primarily vertical vibrations for maximum stratification of the particles.

7. Apparatus as defined in claim 2 wherein said stilling plate is adjustable in a vertical direction to accommodate adjustment of said distributor.

8. Apparatus as defined in claim 2 wherein said weir is adjustable in a vertical direction to vary the amount of liquid flowing thereover.

9. A process of separating granular material according to specific gravity comprising, the steps of evenly distributing the material onto a flat sloped surface, vibrating said surface to cause the material to move toward the lower edge thereof and to cause the lighter material to rise to the top of the heavier material, then gently dropping the material over the lower edge into a relatively quiet zone in a body of water between said edge and a splitter gate which penetrates the surface of the water about one inch, creating an upward vertical flow of water below said quiet zone and between said splitter gate and a weir to enable said upward flow to pick up the lower specific gravity material and carry it over said weir to a location remote from the higher specific gravity material which settles through said quiet zone and said upward flow to collection means, and then separating the higher specific gravity material from the water in the collection means.

References Cited

UNITED STATES PATENTS

| 734,641 | 7/1903 | Wheelock | 209—207 |
| 1,828,760 | 10/1931 | Blatch | 209—158 |
| 2,246,532 | 6/1941 | Prins | 209—18 |
| 2,828,011 | 3/1958 | Whitby | 209—20 |

FOREIGN PATENTS

| 492,106 | 3/1919 | France. |
| 1,252,985 | 12/1960 | France. |

FRANK W. LUTTER, *Primary Examiner.*